(12) United States Patent
Ding

(10) Patent No.: US 11,449,509 B2
(45) Date of Patent: *Sep. 20, 2022

(54) WORKFLOW DRIVEN DATABASE PARTITIONING

(71) Applicant: Palantir Technologies Inc., Palo Alto, CA (US)

(72) Inventor: James Ding, New York, NY (US)

(73) Assignee: Palantir Technologies Inc., Palo Alto, CA (US)

(*) Notice: Subject to any disclaimer, the term of this patent is extended or adjusted under 35 U.S.C. 154(b) by 230 days.

This patent is subject to a terminal disclaimer.

(21) Appl. No.: 16/797,583

(22) Filed: Feb. 21, 2020

(65) Prior Publication Data

US 2020/0201863 A1    Jun. 25, 2020

Related U.S. Application Data

(63) Continuation of application No. 15/871,608, filed on Jan. 15, 2018, now Pat. No. 10,614,069.
(Continued)

(51) Int. Cl.
*G06F 16/2455* (2019.01)
*G06F 16/242* (2019.01)
(Continued)

(52) U.S. Cl.
CPC ...... *G06F 16/24554* (2019.01); *G06F 16/213* (2019.01); *G06F 16/217* (2019.01);
(Continued)

(58) Field of Classification Search
CPC ............ G06F 16/24554; G06F 16/217; G06F 16/221; G06F 16/242; G06F 16/213; G06F 16/2423
See application file for complete search history.

(56) References Cited

U.S. PATENT DOCUMENTS 7,933,867 B1 * 4/2011 Gui .................. G06F 16/283
707/624
10,614,069 B2   4/2020 Ding
(Continued)

FOREIGN PATENT DOCUMENTS

EP          3493073         6/2019

OTHER PUBLICATIONS

U.S. Pat. No. 10,614,069, Workflow Partitioning Driven Database Partitioning, issued Apr. 7, 2020.
(Continued)

*Primary Examiner* — Jensen Hu
(74) *Attorney, Agent, or Firm* — Knobbe Martens Olson & Bear LLP

(57) ABSTRACT

A database is configured to analyze user queries to dynamically partition the database according to a partition scheme. User queries can be rewritten based on the partition scheme so that, in response to queries, partitions including relevant data are read while partitions including irrelevant data can be skipped, reducing latency. Files can be named according to the partition scheme and stored on respective partitions so that low partition management can be implemented by underlying systems. Blocks within files can be sorted and statistics can be determined. The statistics can be used to find and read relevant blocks and skip irrelevant blocks.

20 Claims, 6 Drawing Sheets

Related U.S. Application Data

(60) Provisional application No. 62/593,765, filed on Dec. 1, 2017.

(51) Int. Cl.
*G06F 16/21* (2019.01)
*G06F 16/22* (2019.01)

(52) U.S. Cl.
CPC .......... *G06F 16/221* (2019.01); *G06F 16/242* (2019.01); *G06F 16/2423* (2019.01)

(56) References Cited

U.S. PATENT DOCUMENTS

| | | | | |
|---|---|---|---|---|
| 2002/0194196 | A1* | 12/2002 | Weinberg | G06F 16/258 |
| 2011/0022816 | A1* | 1/2011 | Swett | G06F 16/2282 |
| | | | | 711/173 |
| 2015/0379077 | A1* | 12/2015 | Grosse | G06F 16/24542 |
| | | | | 707/718 |
| 2016/0188669 | A1* | 6/2016 | Duffy | G06F 16/2456 |
| | | | | 707/764 |
| 2017/0132276 | A1* | 5/2017 | Saurabh | G06F 16/24534 |

OTHER PUBLICATIONS

Official Communication for European Patent Application No. 18207915.2 dated Oct. 7, 2021, 11 pages.

Data Dynamics, Inc., "What's a File, What's a Block, What's an Object?" Dec. 12, 2020, retrieved from the Internet: https://www.datadynamicsinc.com/whats-a-file-whats-a-block-whats-an-object/, 3 pages.

* cited by examiner

WORKFLOW DRIVEN DATABASE PARTITIONING

INCORPORATION BY REFERENCE TO ANY PRIORITY APPLICATIONS

The present application is a continuation of U.S. patent application Ser. No. 15/871,608, filed Jan. 15, 2018, which application claims the benefit U.S. Provisional Patent Application No. 62/593,765, filed Dec. 1, 2017. The entire disclosures of all of the above-listed applications are hereby made part of this specification as if set forth fully herein and incorporated by reference for all purposes, for all that they contain.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

This application relates to computer databases and corresponding methods of retrieval of records stored in a database or as computer files, as well as indexing files in a manner that facilitates the retrieval of records and files.

BACKGROUND

As the amount of data in a database increases, the time to perform a query on the data proportionally increases. If vast amounts of data are collected, or if data is collected over a long period of time, the response times for querying the database can become too slow to be practical.

SUMMARY OF THE DISCLOSURE

The storage of data in a database can be optimized based on the workflow or types of queries performed on the data. A columnar database can be used, where the columns indicate variables of interest that are often relevant to queries. The properties may be Boolean properties. These properties can be used to partition the data so that a query for data having a certain property can be performed by accessing one or more partitions, without having to access or search through other partitions. Partitions can also be implemented based on a series of nested properties. Within the partitions, the data can be indexed or ordered. The index or ordering can be used to skip blocks that do not include information relevant to a user query.

To make use of the partitioning scheme, user-written queries can be rewritten before the queries are executed. Whenever possible, the queries can be rewritten to use the columnar properties that are used to partition the data. The queries can be rewritten to make use of the partition hierarchy to avoid searching as many unnecessary partitions as possible in a more efficient order. By using the partitioning scheme, the search space for queries can frequently be reduced. In some applications, the search space is often reduced by about 90%, and the query response time is improved by about 10×.

As queries are performed over time, statistics can be collected, and based on the statistics, the partition scheme can be changed if workflow changes.

Some aspects feature a system including a data store and one or more hardware computer processors configured to execute computer executable instructions. The data store includes a plurality of first data each having a first value for a first variable, stored in a first partition, and a plurality of second data each having a second value for the first variable, stored in a second partition. The one or more hardware computer processors configured to execute computer executable instructions to cause the computer system to receive a user-written query that does not specify the first variable, rewrite the user-written query to include the first value for the first variable in a rewritten query, and based at least in part on the first variable in the rewritten query, execute the rewritten query on the first plurality of data stored in the first data partition.

The system can also have any combination of the following features. The one or more hardware computer processors can be configured to execute computer executable instructions to further cause the computer system to execute the rewritten query on the first plurality of data stored in the first data partition without reading the plurality of second data from the second partition. The first partition can include a plurality of blocks and includes statistics about variables included in the plurality of blocks. The statistics can include data about values for the first variable. The one or more hardware computer processors are configured to execute computer executable instructions to further cause the computer system to, based at least in part on the statistics, read a first block and skip reading a second block. A first file has a first filename indicating a first value of the first variable is stored on the first partition, and a second file has a second filename indicating second value of the first variable is stored on the second partition. The one or more hardware computer processors are configured to execute computer executable instructions to further cause the computer system to determine a frequency of the presence of the first variable in user-written queries. The one or more hardware computer processors are configured to execute computer executable instructions to further cause the computer system to determine a frequency of values of the first variable in query results. The one or more hardware computer processors are configured to execute computer executable instructions to further cause the computer system to determine how frequently the first variable separates query results from data not included in query results. The one or more hardware computer processors are configured to execute computer executable instructions to further cause the computer system to determine a partition scheme based at least in part on a frequency of the first variable, wherein the partition scheme includes storing data having a first value for the first variable on one or more partitions and storing data having a second value for the first variable one or more different partitions. The one or more hardware computer processors are configured to execute computer executable instructions to further cause the computer system to rewrite the user-written query to include the first value for the first variable in a rewritten query based at least in part on the first variable being included in the partitioning scheme. The partitioning scheme is a nested partitioning scheme comprising at least two levels of variables used to separate partitions. A top level variable in the nested partitioning scheme more frequently reduces a search space of the data by larger amounts than a second level variable in the nest partitioning scheme. The first variable is a lower cardinality superset of a user-written variable in the user-written query. The first variable is a Boolean variable. The first variable is a lower cardinality hash of a user-written variable in the user-written query. The one or more hardware computer processors are configured to execute computer executable instructions in order to cause the computer system to: determine a first partition scheme based at least in part on queries in a first workflow; and determine a second partition scheme based at least in part on queries in a second workflow; and wherein the data store includes data redundantly stored under both the first partition scheme and under the second partition scheme.

Some aspects feature a system including one or more hardware computer processors configured to execute computer executable instructions to cause the computer system to: receive a user-written query that does not specify a first variable; rewrite the user-written query to include a first value for the first variable in a rewritten query; and transmit the rewritten query to a database to be executed. The data store includes a database comprising: a plurality of first data each having a first value for a first variable, stored in a first partition; and a plurality of second data each having a second value for the first variable, stored in a second partition. The database is configured to, based at least in part on response to receiving the rewritten query that includes the first value for the first variable, access the first partition to execute the query.

DETAILED DESCRIPTION

Figure 1:
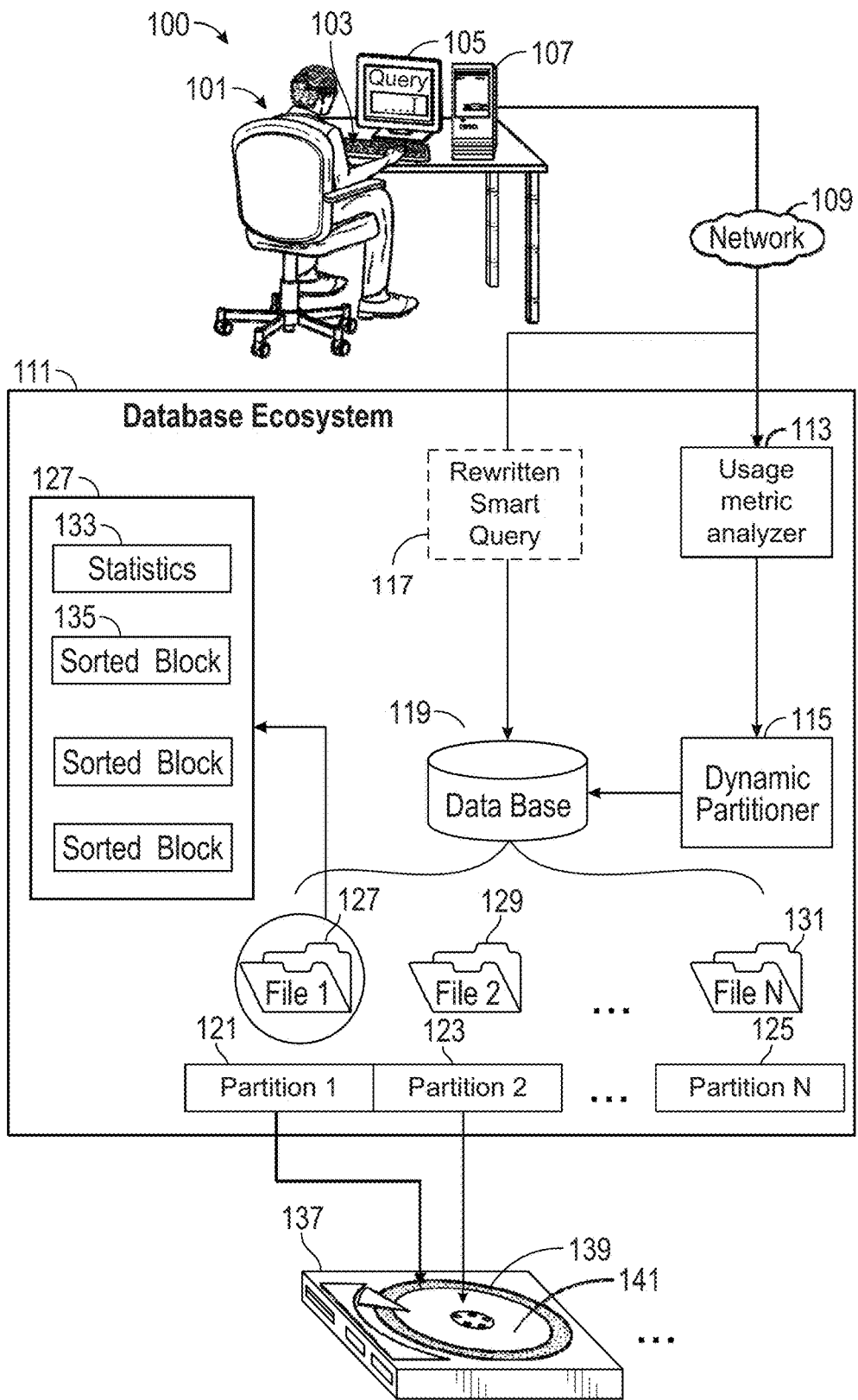
FIG. 1 shows an example system for executing a query on a dynamically partitioned database.

The storage of data in a database can be optimized based on the workflow or types of queries performed on the data. A columnar database can be used, where the columns indicate variables of interest that are often relevant to queries. The properties may be Boolean properties. These properties can be used to partition the data so that a query for data having a certain property can be performed by accessing one or more partitions, without having to access or search through other partitions. Partitions can also be implemented based on a series of nested properties. Within the partitions, the data can be indexed or ordered. The index or ordering can be used to skip blocks that do not include information relevant to a user query.

To make use of the partitioning scheme, user-written queries can be rewritten before the queries are executed. Whenever possible, the queries can be rewritten to use the columnar properties that are used to partition the data. The queries can be rewritten to make use of the partition hierarchy to avoid searching as many unnecessary partitions as possible in a more efficient order. By using the partitioning scheme, the search space for queries can frequently be reduced. In some applications, the search space is often reduced by about 90%, and the query response time is improved by about 10x.

As queries are performed over time, statistics can be collected, and based on the statistics, the partition scheme can be changed if workflow changes.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Introduction

FIG. 1 shows an example system 100 for executing a query on a dynamically partitioned database. The system 100 includes a user 101, computer input devices 103 (such as a keyboard, mouse, touchscreen, or other device), an output device 105 (such as a monitor), a computer system 107, a network 109, a database ecosystem 111, and a data store 137. The database ecosystem 111 includes a usage metric analyzer, a dynamic partitioner 115, a rewritten smart query 117, and a database 119. FIG. 1 also shows representations of a plurality of partitions 121, 123, 125 of the database 119. Each partition 121, 123, and 125 includes a respective file 127, 129, 131. A first file 127 is shown as including a plurality of sorted blocks 135 in the file and statistics information 133 about the plurality of sorted blocks 135. The data store 137 has a data storage device (such as a disk or solid state memory) storing the first partition 121 as a first data partition 139, and the second partition 123 as a second data partition.

The user 101 can write a query to the database 119. In some embodiments, the database 119 can be a columnar database. Many queries can search through data in the database 119 to find information helpful to the user. For example, a company may collect network activity for security purposes and want to review all internet traffic associated with a particular user. All of the internet traffic in the database can be searched, and any internet traffic associated with that user can be returned in response to the query.

However, as the collection of data grows, the search time also grows. Over time, queries that search the database can become impractically slow.

Part of the latency in responding to a query comes from processing the data. As all of the data is read, a processor takes time to filter through the data to determine which portions of the data are relevant to a user query. Processors can operate at limited frequencies, and as the amount of data in a database grows, the processors will take longer and longer times to process the data.

Part of the latency in responding to a query comes from reading the data so that the data can be processed. Data store 137 is shown as a single, one platter hard drive, but in various embodiments, the data store 137 can be a solid state drive or include a plurality of drives. A typical platter hard drive may have a seek time of about 8-15 ms and a rotational speed of 5,400-7,200 rpm. A solid state hard drive may have substantially faster seek times of about 0.1 ms, but solid state drives also cost about 4-10 times as much as platter hard drives.

To perform a query, such as to find internet traffic data associated with a particular user, the data from a data store can be read. The data can be stored across a plurality of locations in a hard drive, such as across a platter of a platter hard drive or in different memory cells of a solid state drive. Even if the data relevant to a query could be specifically identified, the data might still be read from storage locations all across a platter. Reading data spread across a platter can take almost as long as reading the entire platter.

For many databases, most of the value of the database comes from a small portion of the data in the database. For example, about 90% of user queries may access about 10% of a database. As discussed herein, the database storage and retrieval system can be configured such that the 10% of the database that is more frequently accessed can be read more quickly without accessing or reading the 90% of data that is usually irrelevant to user queries.

As users 101 write queries, the queries can be analyzed, and usage metrics can be determined by a usage metric analyzer 113. Based on the usage metrics of user queries, a dynamic partitioner 115 can dynamically partition the database 119 into a plurality of partitions 121, 123, 125. In a columnar database, the columns of the database 119 can be used to create partitions. The partitions 121, 123 can map to storage partitions 139, 141 in a data store 137. For example, on the illustrated platter hard drive, the first partition 121 can be stored as a first partition 139 of the hard drive platter, and the second partition 123 can be stored as a second partition 141 of the hard drive platter. The storage partitions can be implemented differently for platter hard drives and solid state hard drives and also differently for single drives and arrays of drives. Regardless, the storage partitions can facilitate reading a section of data (such as by organizing the data in nearby or contiguous locations on a platter).

A first file 127 can be stored in the first partition 121. A second file 129 can be respectively stored in the second partition 123. The files 127, 129, 131 can be named and organized such that they provide the queried database information without reading the contents of one or more other files. In response to a user query, by referencing the file names or organization of the files, one or more partitions of the platter are accessed in response to the query without accessing other partitions that contain data irrelevant to the query.

For example, a company may collect network activity for security purposes and want to review all internet traffic associated with a particular user. Sometimes, the cardinality of usernames can be too high to use as a basis for partitioning. Dedicating a partition to each username can result in using too many partitions, each of which may incur a small management overhead cost in terms of speed. Too many partitions can slow down the overall response speed. To avoid having too many partitions, a superset variable or lower cardinality variable can be used in the partitions scheme. Boolean column variables can be used to keep the number of partitions low. For example, a low cardinality Boolean variable can indicate if data is associated with a username at all. Data associated with usernames can be stored in one or more partitions, and data unassociated with any usernames can be stored in one or more other partitions. To execute a query to find the data associated with a particular username, the partitions with data associated with usernames can be read without taking additional time to read or process the partitions with data unassociated with any usernames.

Within the file 127, 129, 131, data can be written and retrieved as a plurality of blocks 135. The blocks 135 can be sorted or organized based on at least one variable. Statistics information 133 about the blocks can also be determined. For example, the statistics information 133 can indicate that a first block includes data associated with usernames A-H, a second block includes data associated with usernames I-Q, and a third block includes data associated with usernames R-Z. The statistics information 133 can be referenced so blocks relevant to the query (e.g., for information associated with a particular username) are read while blocks irrelevant to the query can be skipped. Other examples of statistics information include maximums, minimums, ranges, averages, and hashes for each variable included in a block.

A user 101 can write various queries to perform a variety of tasks. For example, the queries can be SQL queries. However, the user 101 can be unaware of the partition scheme. Accordingly, the user may write naïve queries that do not expressly search by a variable used in the partition scheme.

Based at least in part on the partition scheme used to partition the data store, the naïve queries can be automatically rewritten as a smart query 117 to expressly search by a variable used in the partition scheme. An application on the user's computer system 107 or in the database ecosystem 111 can intercept the query and rewrite the naïve query as a smart query 117 before it is executed on the database 119. The smart query can reference variables that are used for the partitions such that, when the query is executed, a limited number of relevant partitions are accessed without accessing other irrelevant partitions. In some embodiments, after rewriting the query to expressly search by a variable used in the partition scheme, predicate push down can be used for implementing the details of partition access. Accordingly, a substantial amount of read time can be saved, regardless of the type of data store 137 used. Additionally, a processor can skip processing the irrelevant data. In some applications the read and search space for most queries can be reduced by about 90%.

Over time, the types of queries written by users can change. The user-written queries or the results of the queries can continue to be analyzed by usage metric analyzer 113, and partition schemes can be changed by the dynamic partitioner 115 to improve the search efficiency. Analyzing usage metrics and dynamic partition are further described with respect to blocks 203, 205, and 207 of FIG. 2 and generally in FIG. 3. As the partition schemes changes in response to changes in user queries, the way that the naïve queries are intercepted and rewritten is accordingly changed to keep up with the partition scheme.

The database ecosystem 111 can be configured to support queries on a database 119. The file structure of the database ecosystem 111 can be implemented using various file systems, such as Hadoop Distributed File System (HDFS) or a single distributed file system (SDFS). In various applications, the database ecosystem can track revisions to data, perform version control, perform operations and analytics on data, etc. The database 119 can be any type of database. In some embodiments, the database 119 can be a columnar database. The database can have various configurations as a SQL database, SparkSQL database, PostgreSQL database, Sysbase database, NoSQL, Cassandra, etc.

Example Flowchart

Figure 2:
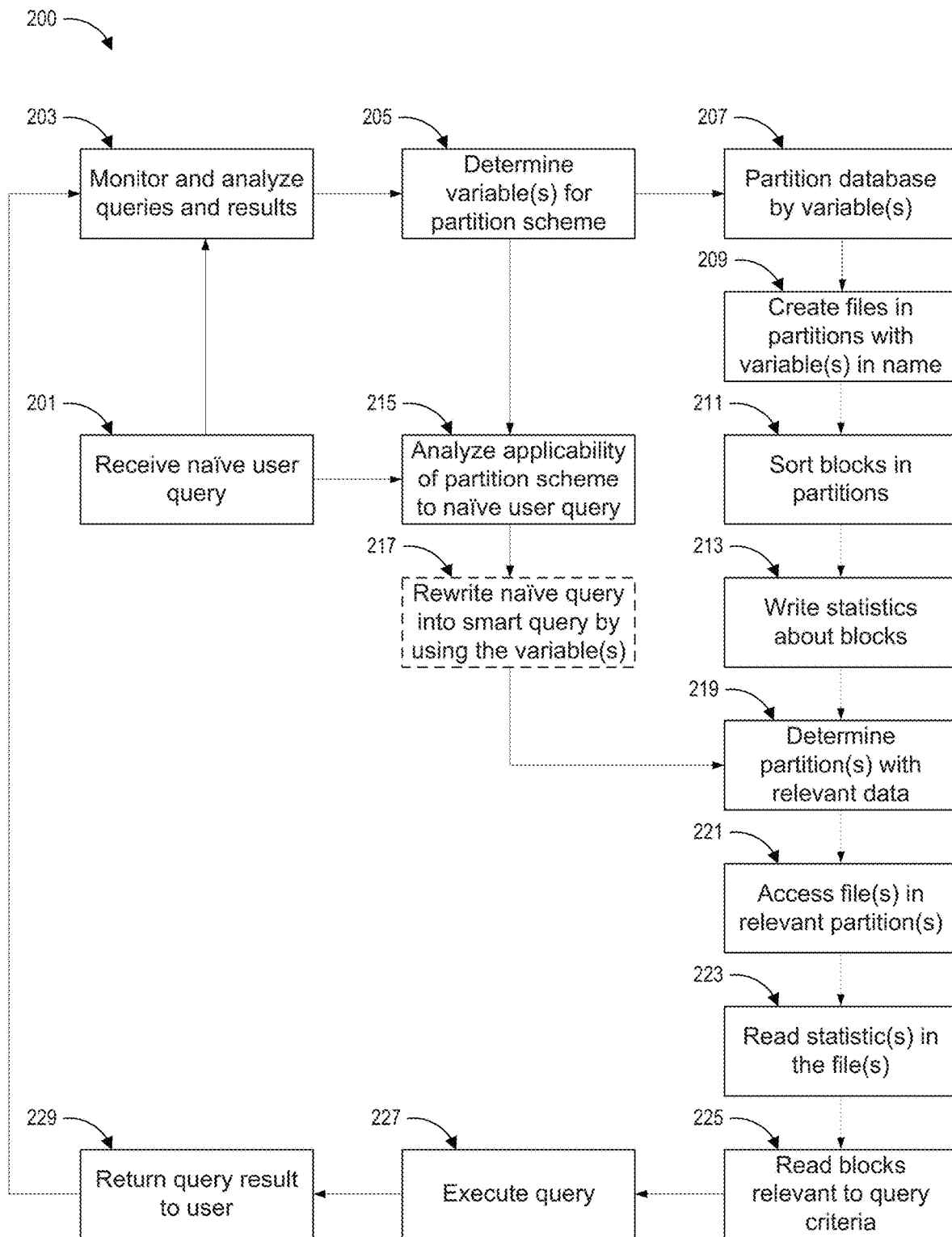
FIG. 2 shows a block diagram of an example method of performing queries on a dynamically partitioned database.

FIG. 2 shows a block diagram 200 of an example method of performing queries on a dynamically partitioned database. In describing FIG. 2, an example of a columnar database of a company's internet traffic data is consistently used to aid understanding of the relationships of the different blocks. However, FIG. 2 is not limited to the example of a database of internet traffic and can be applied to other databases as well.

At block 201, a query is received. The query can be written by a user to query a database. The database can be a columnar database with columns for information such as whether there is any associated user ID, the content of the traffic, the IP addresses, timestamps, etc. The database can be partitioned according to one or more columns of the database. The user can be ignorant of the partitioning scheme. Accordingly, the user may write a naïve query that does not explicitly refer to any column used in the partitioning scheme.

At block 203, the query can be monitored and analyzed as part of a workflow. In some embodiments, query results can additionally or alternatively be analyzed. Information such as the types of people, what project they are working on, their title or role, user identity, and other classification information can be tracked based on a plurality of queries collected over time. The information can be used to classify people to predict what types of information certain groups of users are interested in querying. Many times, users within a workgroup, business division, or other organizational group will query similar types of data. In addition to monitoring who sends the queries, the variables (sometimes referred to as predicates) included within the queries can be analyzed and tracked. For example, an information technology (IT) department in the company may regularly review the internet traffic of some users for various reasons. IT personnel may query the database, for example, to look for anomalous network activity by particular users. The queries from the IT department can be analyzed to determine that most of the queries search for information associated with particular users.

At block 205, variables for a partition scheme can be determined based at least in part on the analysis of the queries. The variables in block 205 are further described as "second variables" respect to FIG. 3. The variables can be database columns that are a superset of, have lower cardinality than, or be a hash of certain columns in the database. In some embodiments, the variables can be Boolean variables. For example, internet traffic associated with users can be a subset of authenticated internet traffic. Whether or not internet traffic is authenticated is a Boolean variable of lower cardinality than user identities. Furthermore, in some networks, internet traffic can have a lopsided distribution of unauthenticated (e.g., about 90%) to authenticated (e.g., about 10%) internet traffic. Accordingly, whether or not internet traffic is authenticated can be a variable used in a partition scheme and can also be a column of the database.

At block 205, one or more variables can be determined for a partition scheme. In some embodiments, a plurality of variables is determined. If a plurality of variables is determined, then a hierarchy of the variables (e.g., as further shown and described with respect to FIG. 4) can also be determined as part of the partition scheme.

At block 207, the database can be partitioned based at least in part on the partition scheme. For example, as shown in FIG. 1, authenticated internet traffic can be stored in a first partition 139 of a data store, and unauthenticated internet traffic can be stored in a second partition 141 of the data store.

At block 209, respective database files can be created in the respective partitions. For example, as shown in FIG. 1, authenticated internet traffic can be stored in a first file 127 on the first partition 139. The file can be named to indicate the value of the Boolean variable used for the partition. For example, the first file 127 can be named "authenticated=true." The unauthenticated internet traffic can be stored as a second file 129 on the second partition 141, and the second file 129 can be named "authenticated=false."

At block 211, within each file, blocks of data can be sorted and stored in partitions. For example, within the first file 127 of authenticated internet traffic, the data can be sorted by username. In database systems, data can be written and read as blocks of data. For example, HDFS splits individually written files into multiple blocks and stores those blocks across nodes. In large scale database systems, blocks can be various sizes, such as 64 MB, 128 MB, etc. In some smaller scale database systems, blocks of data can be much smaller, such as 64 kB, 1 MB, etc. Individual blocks can be repeatedly fetched and then assembled together into a file. Accordingly, a first block may include data for internet traffic associated with usernames starting with A-H, a second block includes data associated with usernames starting with I-Q, and a third block includes data associated with usernames starting with R-Z.

At block 213, statistics information can be written about the blocks. For example, the statistics information can indicate that first block includes data for internet traffic associated with usernames A-H, the second block includes data associated with usernames I-Q, and the third block includes data associated with usernames R-Z. Other statistics information can include, for example, maximum and minimum IP addresses associated with data in a block, or any statistics information about any other column of the database.

In response to receiving the naïve user query at block 201, at block 215 the naïve user query can be analyzed to determine if the partition scheme can be used to expedite the query. For example, at block 205, the partition scheme of authenticated/unauthenticated data was determined based at least in part on the frequency of queries for internet traffic associated with particular users. Accordingly, if a naïve query received at block 201 seeks to find information about internet traffic associated with a first user (e.g., John), then the partitioning scheme is applicable and can be invoked to provide a faster query response to the user, even if the query does not explicitly specify any criteria about authenticated internet traffic.

At block 217, the naïve query can be rewritten to explicitly include at least one variable used as a basis for partitioning. For example, a naïve query to find information about internet traffic associated with a first user can be rewritten as a query to find information about authenticated internet traffic associated with the first user.

At block 219, a database ecosystem executing the query can determine which partitions include data that is relevant to the query. The database ecosystem can, for example refer to the partition scheme or read the filenames of files. For example, if the query specifies authenticated data, then the database ecosystem can, based at least in part on the filename of the first file 127 including "authenticated=true" and on the storage of the first file 127 on the first partition 139, determine that the first partition 139 includes relevant authenticated data. Additionally, based at least in part on the filename of the second file 129 and the storage of the second file 129 on the second partition 141, the database ecosystem can determine that the second partition 141 does not include relevant authenticated data, and the second partition 141 can be skipped and not read.

By skipping the second partition 141 of authenticated data, the search space for finding internet traffic associated with the first user can be substantially reduced. For example, based on the lopsided distribution of 90% unauthenticated to 10% authenticated internet traffic described above, 90% of the search space can be reduced. By not searching through or reading the partition of unauthenticated data, latency associated with searching and reading through that portion of the data store can be avoided.

At block 221, the file on the relevant partition can be accessed.

At block 223, the statistics information about the file can be read. The statistics information can be used to determine which blocks within a file to read. For example, in response to a query to find information about authenticated internet traffic associated with the first user, John, the statistics information can indicate that the second block (associated with usernames I-Q) includes information for reading and searching through, while the first and third blocks are associated with usernames that are not relevant to the query.

At block 225, the blocks with data relevant to the query criteria can be read from the partition. The blocks without data relevant to the query can be skipped. Accordingly, additional read latency and processing latency can be avoided.

At block 227, the query can be executed on the block of relevant data read from the relevant partition.

At block 229, the query result can be returned to the user. The query result can also be provided for analysis at block 203.

Example Flowchart

Figure 3:
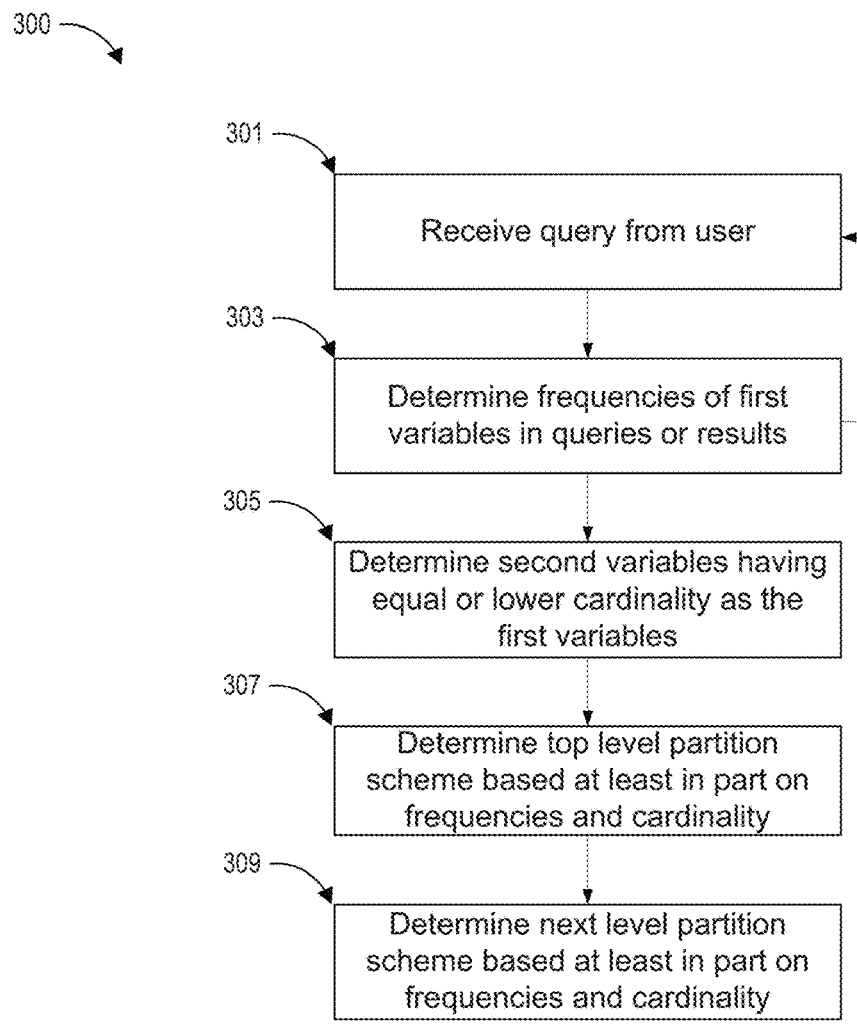
FIG. 3 shows a block diagram of an example method for determining a partition scheme.

FIG. 3 shows a block diagram 300 of an example method for determining a partition scheme, such as described at block 205 in FIG. 2.

At block 301, a query is received from a user. The query is a naïve query, but can sometimes be a smart query.

At block 303, a frequency of first variables in the query or in query results is determined. Here, the "first" variable is used as a label that is distinct from the "second" variables, and "first variables" are not necessarily the first variable specified in a query and "first" is not intended to describe any numerical ordering.

In some embodiments, the first variables can be specified in the user queries. As a first example, users may frequently query a database of internet traffic for three different queries: what time particular people accessed websites, which websites were accessed by those people, and how much data each person accessed. The queries include first variables of timestamps, user identities (e.g., usernames) associated with the internet traffic, websites accessed, and a quantity of data. Based on an analysis of those queries, the user identity is the first variable that is most frequently searched.

Additionally or alternatively, the first variables can be variables in query results. The frequency of which first variables apply to the query results can be determined. This can include tracking the distribution of variable values in the query results. As a second example, users may write queries to a database of internet traffic, and the queries may not explicitly search for internet traffic associated with particular usernames. Despite the lack of explicitly searching for internet traffic associated with particular usernames, query results can still frequently return data associated with particular usernames, and the frequency of those particular usernames in results can be determined.

Additionally or alternatively, the first variables can be the variables in query results that have different values in comparison to data that is not returned as a query result. As a third example, a user may write a query to a database of internet traffic to look up which websites people visited. Among the query results, if unauthenticated data is not (or is infrequently) returned, it can be determined that unauthenticated data is not (or is infrequently) returned in query results.

The first variables can correspond to the columns of a columnar database. In some embodiments, the first variables can be a function (e.g., a hash) of one or more columns of a columnar database.

In some embodiments, blocks 303 and 301 can be repeated a plurality of times. Through repetition, the frequencies of the first variables can be tracked, and the frequencies can be updated as more information is gathered. Also, the frequencies can change as users change the types of tasks that they perform, and change their query criteria accordingly. Therefore, the frequencies can be dynamically updated to keep pace with changes in user queries, and the updated information can be used to dynamically update the partition scheme.

The frequency can be tracked and accumulated across a plurality of queries written by the same or different users. One or more frequently (or infrequently) queried first variables can be determined. In some embodiments, various groups of users (in a same department, having a similar role or title, those who work at certain times of days, etc.) can each have characteristic workflows and be interested in querying for certain types of data. The frequency can be tracked and analyze for each workflow or each group of users. The frequencies can be updated when new queries are executed and received. In some embodiments, the frequencies can be weighted more heavily based on recently received queries, and older data can be weighted less or be ignored. This way, the frequency analysis can be updated as users change their workflows and query different types of data.

At block 305, second variables can be determined. The second variables can have an equal or lower cardinality as one of the first variables. For example, a second variable can be a superset of or a hash result of a first variable. A Boolean variable (true, false) has low cardinality. A variable such as a number used for a user identity has relatively higher cardinality. In some embodiments, the second variables can be new variables that are not originally present in a columnar database. The second variable can be added to the database as a new column if the second variable is effective at reducing the search space.

The second variables can be those that, when filtered on, would encompass frequently queried data and separate data less frequently returned by queries. When filed on, the second queries can reduce the search space. Accordingly, the second variables can be selected based at least in part on how often the second variables distinguish queried data from data that is not hit by queried.

Continuing the first example described with respect to FIG. 3, the presence of a user identity was determined to be a frequently queried variable. Accordingly, the user identity can be determined as a second variable.

Continuing the second example described with respect to FIG. 3, query results can include various usernames. The presence of a username (yes it is present or no it is not) is a Boolean variable with a low cardinality. The particular values of usernames (e.g., Adam, Bob, Charlie, ... ) has high cardinality. Based at least in part on the frequent occurrence of usernames in query results and a comparison of the cardinality of the Boolean presence of a username to the cardinality of values of usernames, the Boolean presence of a username can be determined as the second variable.

Continuing the third example described with respect to FIG. 3, it was determined that whether internet traffic is authenticated frequently separates data results. Accordingly, whether internet traffic is authenticated can be determined as the second variable.

As an example of hashing, a driver record database includes columns for first names, last names, driver license number, and traffic violations. The database is most frequently queried to look up driver license numbers to find real names and what traffic violations they may have committed. The driver license number is the most often queried variable, and can be stored in the database as an integer. In such a system, a new column that is a hash of the driver's license number can be used to reduce the cardinality of that variable. For example, a Boolean hash can be true if the driver's license number is even. About half the time, the hash will evaluate as true. Accordingly, database information about odd numbered driver licenses can be stored in a first partition, while database information about even numbered driver licenses can be stored in a second partition. In some embodiments, uneven hashing functions that distinguish between often queried data can be used. For example, a plurality of hashing functions can be used for analysis, and the hashing functions that perform better at discerning query results can be used to generate the second variable.

At block 307, a top level partition scheme can be determined. One of the second variables can be selected as a basis for the top level partition scheme based at least in part on how much the search space of a database can be reduced. A second variable that is more effective at reducing the search space of a database can be used at a higher level of the partition scheme. The second variable used for the top level partition can selected based on a frequency of queried first variables that are included in a subset of the second variable. A second variable that is a lower-cardinality superset of a frequently queried first variable can be used as the top level partition. Additionally or alternatively, the second variable used for the top level partition scheme can be selected based at least in part on how effective second variable is at distinguishing between queried data and data that is not hit by queries.

At block 309, a next level partition scheme can be determined. A different one of the second variables can be selected as the basis of the next level partition scheme based on similar criteria as discussed with respect to block 307. The variables used in the next level partitions can be less progressively effective at reducing the search space of a database.

As discussed with respect to block 215 and 217 of FIG. 2, the partition scheme determined in blocks 307 and 309 can be used to rewrite the naïve query. If a partition scheme based on a second variable was determined, at least in part, based on the presence of a first variable in queries and the second variable is a superset of the first variable, then queries that include the first variable can be rewritten to include the second variable.

Example Database and Nested Partitions

Figure 4:
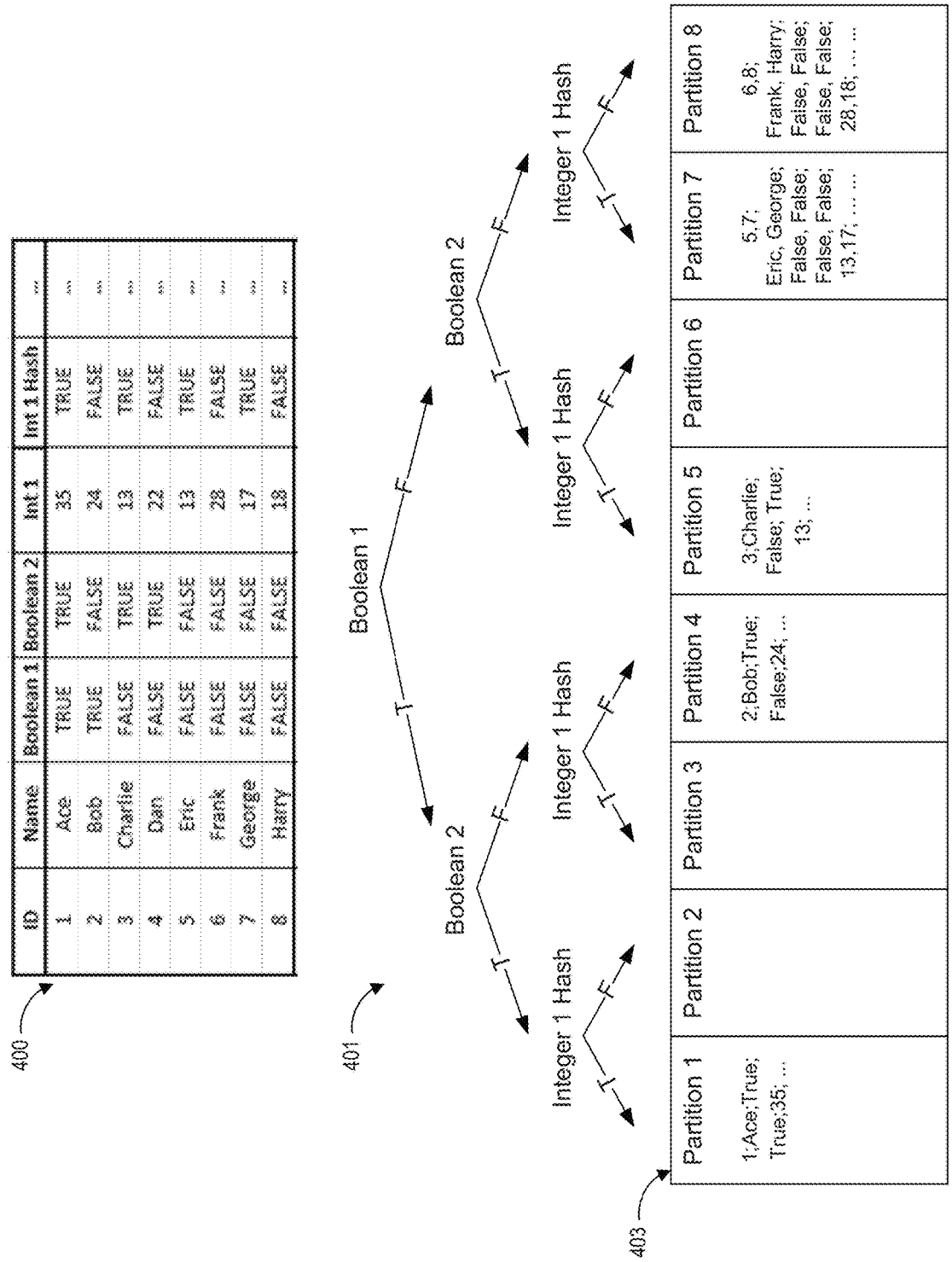
FIG. 4 shows an example of a database and how the information in the database can be stored on different partitions.

FIG. 4 shows an example of a database 400 and how the information in the database can be stored on different partitions. The database 400 is a columnar database with a plurality of column variables (row ID, Name, Boolean variable 1, Boolean variable 2, an integer variable, a hash of the integer variable, and other columns indicated by " . . . "). A logic tree 401 shows a scheme for how portions of the database can be split and stored into different partitions according to a partition scheme. A plurality of partitions 403 are shown, along with portions of the database stored in files on each partition.

The database 400 can be queried by users. For example, users may query the database 400 to find the names of everyone for which Boolean 1 is true. As another example, users may query the database 400 to find everyone for which Boolean 2 is false and other criteria (in the " . . . " column) is satisfied. As another example, users may query the database 400 to find the average integer value for all entries where Boolean 1 is true and Boolean 2 is false.

Based on how frequently the variables are queried and how much the variable can distinguish between queried data and data that is not hit by queries, a partition scheme can be determined with a top level partition, a second level nested partition, and a third level nested partition. At the top level, data is partitioned based on Boolean 1. At the second level, data is partitioned based on Boolean 2. At the third level, data is partitioned based on the hash of the integer 1, where the hash algorithm is true if integer 1 is odd. FIG. 4 shows 3 Boolean (cardinality=2) variables. The total number of partitions can be the product of the cardinality at each level in the partition. In the example shown, the total is 2×2×2, or $2^3$ which is 8.

Partition 1 can include a file that is named to indicate that it includes data for which Boolean 1 is true, Boolean 2 is true, and the integer 1 hash is odd. For example, the file on partition 1 can be named "Bool1=true_Bool2=true_Hash=true." The data for row 1 satisfies these criteria and is stored in the first partition. As shown in FIG. 4, the other partitions include the respective data from the data table 400 that satisfy the criteria in the logic tree 401, and files on the other partitions can have names that indicate the variables of data included therein. In some embodiments, the empty partitions (2, 3, and 6) and their corresponding files are not implemented or created until there is data to store in the partitions and files.

As an example, a query can seek the names of everyone for which Boolean 1 is true. Based on the partitioning scheme or based on reading the filenames, partitions 1-4 can be read (partitions 2 and 3 can be skipped if empty) to return Ace and Bob. Partitions 5-8 can be skipped, and the latency associated with reading partitions 5-8 and processing the data therein can be avoided.

As another example, a query can seek the names of everyone for which Boolean 1 is true and Boolean 2 is also true. Based on the partitioning scheme or reading the filenames, partitions 1 and 2 can be read to return Ace.

Partitions 3-8 can be skipped, and the latency associated with reading partitions 3-8 and processing the data therein can be avoided.

As another example, a query can seek the names of everyone for which Boolean 1 is true, Boolean 2 is true, and the integer is 13 (which is an odd number). Based on the partitioning scheme or reading the filenames, partition 1 can be read and searched through for people who have an integer of 13. The query result can return empty. Partitions 2-8 can be skipped, and the latency associated with reading partitions 2-8 and processing the data therein can be avoided.

As another example, a query can seek the names of everyone for which the integer is 13. 13 is an odd number. Based on the partitioning scheme or reading the filenames, partitions 1, 3, 5, and 7 can be read. The data within these partitions can be searched to find that Charlie and Eric have integer values of 13, and their names can be returned as a result of the query. Partitions 2, 4, 6, and 8 can be skipped, and the latency associated with reading partitions 2, 4, 6, and 8 and processing the data therein can be avoided.

By naming files according to the partitioning scheme and saving the files on the corresponding partitions, a higher-layer computing environment engine (e.g., Spark) can search for the appropriate files without determining which partition to access. A separate, lower layer operation can manage which partition to read. For example, Spark can run certain filters first (e.g., based on the second variables described below) that cause a lower-layer computing environment manager to read only the relevant partitions.

Figure 5:
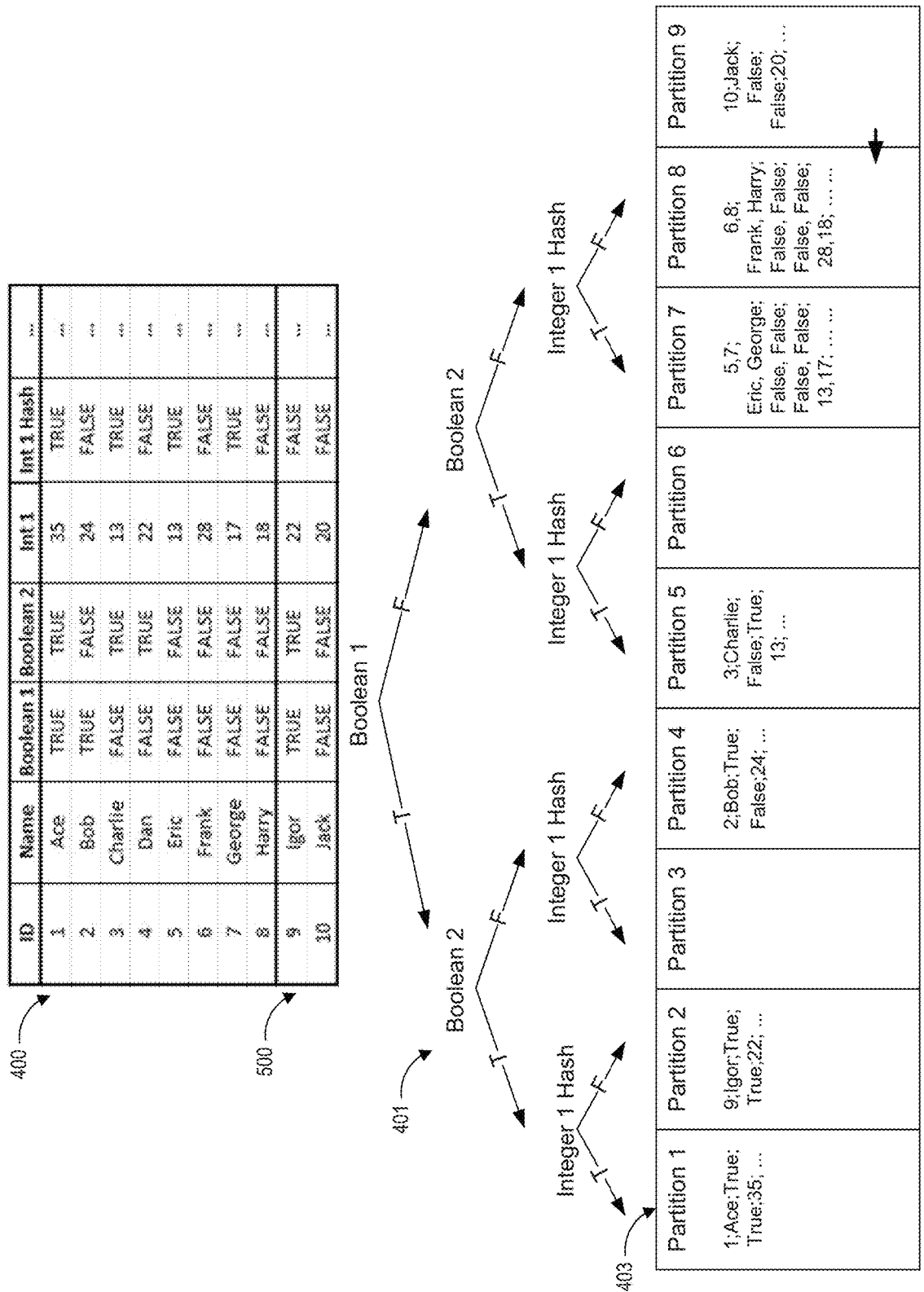
FIG. 5 shows an example of a database with updated information and how the information in the database can be stored on different partitions.

FIG. 5 shows an example of a database 400 with updated information 500 and how the information in the database can be stored on different partitions. Many databases can receive and be updated with new information.

As shown in the table, new data for row 9 has been added to the database. The new data for row 9 can be written to a file in the previously empty partition 2 (which can be created if it did not previously exist due to a lack of data).

As shown in the table, new data for row 10 has been added to the database. According to the logic tree 401, the new data for row 10 can be added to the file in partition 8, especially for databases written data is written relatively infrequently and the database includes relatively smaller quantities of information. In large databases, reading the file, writing the file, and recalculating statistics for the file can take longer periods of time. If the database is frequently or constantly updated with information, then the constant updates can cause the partitions to be busy, thereby slowing down access speeds by users.

In some embodiments, to add the new data shown for row 10, the new data can be stored in a new file on a new partition (e.g., partition 9). The new partition can be used to store all newly added data, and the new partition can be searched through whenever a query is received. In some embodiments, a plurality of new partitions can be created according to the scheme indicated by the logic tree 401, and new data can be stored in the corresponding partitions.

In comparison, the new partitions can hold relatively smaller amounts of data as compared to an older database. The files in the new partitions (such as partition 9) can be read and rewritten faster than the files in the original partitions (e.g., partitions 1-8) can be read and rewritten. Similarly, statistics for the blocks in the new partitions can be recomputed faster than statistics for the blocks in the original partitions. When new data is received for adding to the database, the new partitions can be created or edited to include the new data at faster speeds.

At certain intervals or periods, after certain amounts of new data has been added to the database or stored on a partition, or based on other criteria, the data in new partitions (such as partition 9) can be coalesced with other partitions (such as partition 8). For example, during low usage periods (e.g., overnight), partition 9 can be coalesced with partition 8. This can include reorganizing or rearranging the blocks of partition 8 to include the data from partition 9 and updating the statistics about the blocks.

Example Applications

In some embodiments, the file 127 shown in FIG. 1 is stored as a plurality of blocks on a partition 121. In big datacenters, the blocks can be large, such as 32 MB, 64 MB, 128 MB, 256 MB, or larger. Due to the large sizes of the blocks, reading each block can take time, and processing the data in the block introduces additional latency to a response.

In an example, a database 119 shown in FIG. 1 can store internet traffic. A user can query the database 119 for information about a particular username and a particular IP address. The files can be named according to a partition scheme that includes whether or not the internet traffic is authenticated. Authenticated internet traffic is a lower cardinality superset of internet traffic with usernames. Accordingly, the files with names indicating authenticated traffic can be identified and the statistics 133 of each file 127 can be analyzed. The statistics can indicate, for example, which blocks have which ranges of IP addresses. If the particular IP address is not included in a block 135, then the block can be skipped. The statistics can also indicate that the blocks are sorted alphanumerically by username. The blocks that do not include the queried username can also be skipped. Accordingly, the relevant blocks (if any) can be quickly read and processed.

In some embodiments, a database 119 shown in FIG. 1 includes data for querying. It can be determined (e.g., according to the block diagram 300 shown in FIG. 3) that users who query the data are frequently interested in data collected within the past month (or week or other recent period), and other data outside of that time period is rarely queried. As a result, a Boolean variable "recent" can be determined, where the recent variable evaluates to true if the data was generated within the month. The recent variable can be updated daily or periodically. Accordingly, recently added data can be stored on partitions separate from older data according to the techniques described herein.

In some embodiments, a partition scheme can include a recent or similar variable in at least one of a plurality of levels of the partition scheme. The recent variable can be a Boolean variable that evaluates to true if the data was generated, updated, modified, etc. within the past 1-6 days, weeks, or within a month. In some embodiments, a top level partition can be a date that the data was generated, updated, or modified. In response to a naïve query that searches for data related to a particular date, the system can evaluate if data for that particular date is included in one of the partitions of "recent" data, and if so, rewrite the naïve query into a smart query to indicate that "recent=true."

In some embodiments, data can be collected in a database in real time. As shown in FIG. 5, a number of additional partitions can be used to store real time data. For example, new partitions can collect data for each new hour such that there are 24 partitions for real time data. The data in the new partitions can be coalesced into other partitions overnight. In some embodiments, the new partitions can implement a different partition scheme (e.g., partitioned by the hour) than an original partition scheme (e.g., the partition scheme shown for partitions 1-8 in FIG. 5). In some embodiments, there can be partitions by the hour that also implement the original partition scheme.

In some embodiments, the data in a database (e.g., database 119) can be partitioned according to a plurality of partition schemes and redundantly stored. The different partition schemes can be determined based at least in part on the queries used by people for different workflows. For example, a business may have a database of sales, inventory, inventory cost, and sales data. Inventory managers may be interested in very recent data to make purchasing decisions to replace inventory. The inventory managers' workflows may include frequently query for data within the past 24 hours to determine if the inventory is low. Accordingly a first partition scheme may include whether the data is recent and is currently offered for sale as different levels of partition criteria. An accountant on the other hand, may frequently run queries on the database for last year's sales data to determine profits and file taxes. Accordingly, a second partition scheme can include whether the data is last year's data and whether the data is of sold items. The data in the database can be stored on a first plurality of partitions according to the first partition scheme and also stored on a second plurality of partitions according to the second partition scheme. In response to receiving a new query, the variables of the new query or the workflow context can be analyzed to determine which of the partition schemes the query can be processed under. Then, the partitions with the relevant data can be read and analyzed. By selecting the better partitioning scheme, less time can be spent reading and processing irrelevant data.

In some embodiments, a database can include internet traffic. The database can be queried by security analysts to find unusual internet traffic. Based on an analysis of the queries and data results, it can be determined that traffic to various popular top level domains can be commonplace. In some embodiments, how a user further interacts with query results can be used to determine the partitioning scheme. For example, based on query results, it can be determined that the security analysts are not interested in and rarely further interact with commonplace internet traffic to popular top level domains. A Boolean variable can be used to label internet traffic associated with the popular top level domains as "uninteresting." The uninteresting data can be stored on one or more separate partitions that are not searched unless a query variable specifically indicates otherwise. For example, a user can specifically query for internet traffic associated with a URL included in a popular top level domain to cause the partition of uninteresting data to be searched.

In some embodiments, a database can include internet traffic. One or more partitions can include data associated with internet traffic to the 100 most popular websites. In response to a user query for internet traffic associated with a particular website www.examplewebsite.com, it can be determined whether www.examplewebsite.com is included in the top 100 most popular websites. The user's query can be rewritten into a smart query by adding a Boolean "isPopularWebsite=true" or "isPopularWebsite=false" before the query is executed.

In some embodiments, the database can include firewall data. The firewall data can include traffic associated with internal and external traffic. Application engineers may write queries for traffic to or from specific computers that happen to be external devices. Computer security engineers may write queries to find traffic to addresses that happen to be internal devices. Accordingly, a partitioning scheme based on traffic to external or internal devices can be implemented, even if the users to not explicitly write those variables in their queries. The variables can be written into the queries before they are executed, for example as discussed with respect to block 217 of FIG. 2.

In some embodiments, to rewrite queries, a query variable used as a basis of the partitioning scheme can be identified. For example, based on frequent queries to a database of internet traffic to find internet traffic associated with usernames, a partitioning scheme store authenticated data on different partitions from unauthenticated data. Whenever a query is written and includes a username variable, the query can be rewritten to also include a variable explicitly indicating authenticated data.

In some embodiments, a database can store internet traffic. One of the columns of the database can be an IP address. A hashing function can be used to bisect the collection of IP addresses such that about half the time the hash is true. When a user writes a query to search for an IP address, the query can be rewritten to explicitly include the hash value.

In some embodiments, data can have a description field. The description of the data can have high cardinality. For example, the description field may capture a manually written description of a product. Accordingly, the description can have high cardinality. The description can be a column of a database. The data in the database can be partitioned based at least in part on a Boolean variable indicating whether or not the description is blank or empty.

In some embodiments, data can have any high cardinality description, such as a title, a review, or human-generated data. For storing the data, the data can be partitioned based at least in part on a Boolean variable indicating whether or not those columns are blank or empty. If a search is performed to find data having a certain title, description, or other field, then the partitions where that column are empty can be skipped, and partitions storing data where the searched field is not empty can be read and searched.

In some embodiments, a columnar database can be used to track events in computer systems. The columnar database can track many unique events. Based on an analysis of workflow, a Boolean variable can be used to indicate whether an event is a particular event type that is frequently queried for. The frequently queried event types can be stored on one or more partitions, and other event types can be stored on separate partitions.

In some embodiments, user workflows change and the frequency of variables in queries and query results also change. As new query data is collected and analyzed, such as described with respect to blocks 301 and 303 in FIG. 3, the partitioning scheme can change. Sometimes, a partitioning scheme based on a new variable can be used. In some embodiments, the ordering of levels of an existing partitioning scheme can be rearranged.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
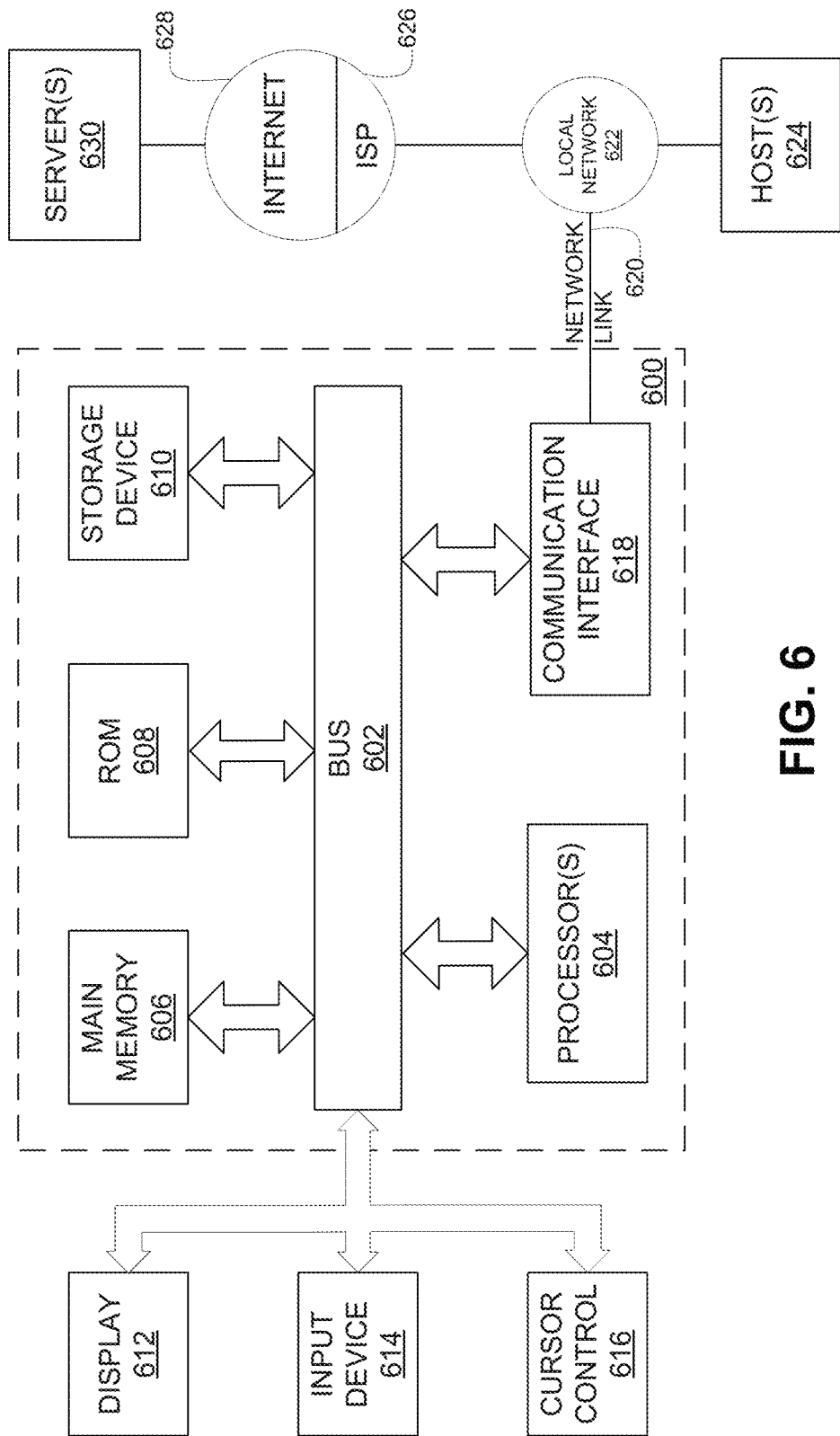
FIG. 6 is a block diagram that illustrates a computer system upon which various embodiments may be implemented.

For example, FIG. 6 is a block diagram that illustrates a computer system 600 upon which various embodiments may be implemented. For example, the computer system 600 can be the computer system 107 shown in FIG. 1. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. For example, the display 612 can be the monitor 105 shown in FIG. 1. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor. The input device 614 can be, for example, the input devices 103 shown in FIG. 1.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. For example, the network 109 shown in FIG. 1 can be the Internet 628 or the local network 622. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system comprising:
a data store comprising:
a plurality of first data each having a first value for a first variable, stored in a first partition, wherein the first partition comprises a plurality of blocks and includes statistics about variables included in the plurality of blocks, and wherein the plurality of blocks is sorted; and
a plurality of second data each having a second value for the first variable, stored in a second partition; and
one or more hardware computer processors configured to execute computer executable instructions to cause the computer system to:
receive a user-written query that does not specify the first variable;
rewrite the user-written query to include the first value for the first variable in a rewritten query;
based at least in part on the first variable in the rewritten query, execute the rewritten query on the first plurality of data stored in the first data partition; and
based at least in part on the statistics, read a first block in the first partition and skip reading a second block in the first partition.

2. The computer system of claim 1, wherein the statistics include data about values of the first variable.

3. The computer system of claim 1, wherein the plurality of first data in the first partition are configured to be fetched as the plurality of blocks.

4. The computer system of claim 1, wherein the plurality of blocks are of a common block size.

5. The computer system of claim 1, wherein the one or more hardware computer processors are configured to execute computer executable instructions to further cause the computer system to:
based at least in part on the statistics indicating that values of the first variable in the first block include the value for the first variable, read the first block in the first partition; and
based at least in part on the statistics indicating that values of the first variable in the second block do not include the value for the first variable, reading the second block in the first partition.

6. The computer system of claim 1, wherein the one or more hardware computer processors are configured to execute computer executable instructions to further cause the computer system to:
execute the rewritten query on the first plurality of data stored in the first partition without reading the plurality of second data from the second partition.

7. The computer system of claim 1, wherein:
a first data file has a first filename and is stored in the first partition, the first filename indicating the first value of the first variable; and
a second data file has a second filename and is stored in the second partition, the second filename indicating the second value of the first variable.

8. The computer system of claim 1, wherein the one or more hardware computer processors are configured to execute computer executable instructions to further cause the computer system to:
determine a frequency of a presence of the first variable in user-written queries.

9. The computer system of claim 1, wherein the one or more hardware computer processors are configured to execute computer executable instructions to further cause the computer system to:
determine a frequency of values of the first variable in query results.

10. The computer system of claim 1, wherein the one or more hardware computer processors are configured to execute computer executable instructions to further cause the computer system to:
determine how frequently the first variable separates query results from data not included in the query results.

11. The computer system of claim 1, wherein at least the first variable is part of a nested partition scheme, and wherein the one or more hardware computer processors are configured to execute computer executable instructions to further cause the computer system to:
determine the nested partition scheme based at least in part on a frequency of the first variable, wherein the nested partition scheme includes storing data files having the first value for the first variable on one or more partitions that include the first partition and storing data files having the second value for the first variable on one or more different partitions that include the second partition.

12. The computer system of claim 11, wherein the one or more hardware computer processors are configured to execute computer executable instructions to further cause the computer system to:
rewrite the user-written query to include the first value for the first variable in a rewritten query based at least in part on the first variable being included in the nested partition scheme.

13. The computer system of claim 11, wherein the nested partition scheme comprises at least two levels of variables used to separate partitions.

14. The computer system of claim 13, wherein the variables at the higher levels of the nested partition scheme more frequently reduce a search space of the data store by larger amounts than the other variables at the lower levels of the nested partition scheme.

15. The computer system of claim 1, wherein the first variable is a lower cardinality superset of a user-written variable in the user-written query.

16. The computer system of claim 1, wherein the first variable is a Boolean variable.

17. The computer system of claim 1, wherein the first variable is a lower cardinality hash of a user-written variable in the user-written query.

18. The computer system of claim 1, wherein the one or more hardware computer processors are configured to execute computer executable instructions in order to cause the computer system to:
  determine a first partition scheme based at least in part on queries in a first workflow; and
  determine a second partition scheme based at least in part on queries in a second workflow,
  wherein the data store includes data redundantly stored under both the first partition scheme and under the second partition scheme.

19. A computer-implemented method comprising:
  by one or more hardware computer processors executing computer executable instructions:
    accessing a data store comprising:
      a plurality of first data each having a first value for a first variable, stored in a first partition, wherein the first partition comprises a plurality of blocks and includes statistics about variables included in the plurality of blocks, and wherein the plurality of blocks is sorted; and
      a plurality of second data each having a second value for the first variable, stored in a second partition;
    receiving a user-written query that does not specify the first variable;
    rewriting the user-written query to include the first value for the first variable in a rewritten query;
    based at least in part on the first variable in the rewritten query, executing the rewritten query on the first plurality of data stored in the first data partition of the data store; and
    based at least in part on the statistics, reading a first block in the first partition and skipping reading a second block in the first partition.

20. A computer program product comprising a non-transitory computer readable storage medium having program instructions embodied therewith, the program instructions executable by one or more processors to cause the one or more processors to:
  access a data store comprising:
    a plurality of first data each having a first value for a first variable, stored in a first partition, wherein the first partition comprises a plurality of blocks and includes statistics about variables included in the plurality of blocks, and wherein the plurality of blocks is sorted; and
    a plurality of second data each having a second value for the first variable, stored in a second partition;
  receive a user-written query that does not specify the first variable;
  rewrite the user-written query to include the first value for the first variable in a rewritten query;
  based at least in part on the first variable in the rewritten query, execute the rewritten query on the first plurality of data stored in the first data partition of the data store; and
  based at least in part on the statistics, read a first block in the first partition and skip reading a second block in the first partition.

* * * * *